July 2, 1968  J. W. EDWARDS ETAL  3,390,756
GENEVA TYPE ACTUATING MECHANISM
Original Filed Aug. 25, 1965  5 Sheets-Sheet 1

INVENTORS
JAMES W. EDWARDS
SHELLY W. MAYS
RODNEY W. STOUT
BY
Robert J. Schaap
ATTORNEY

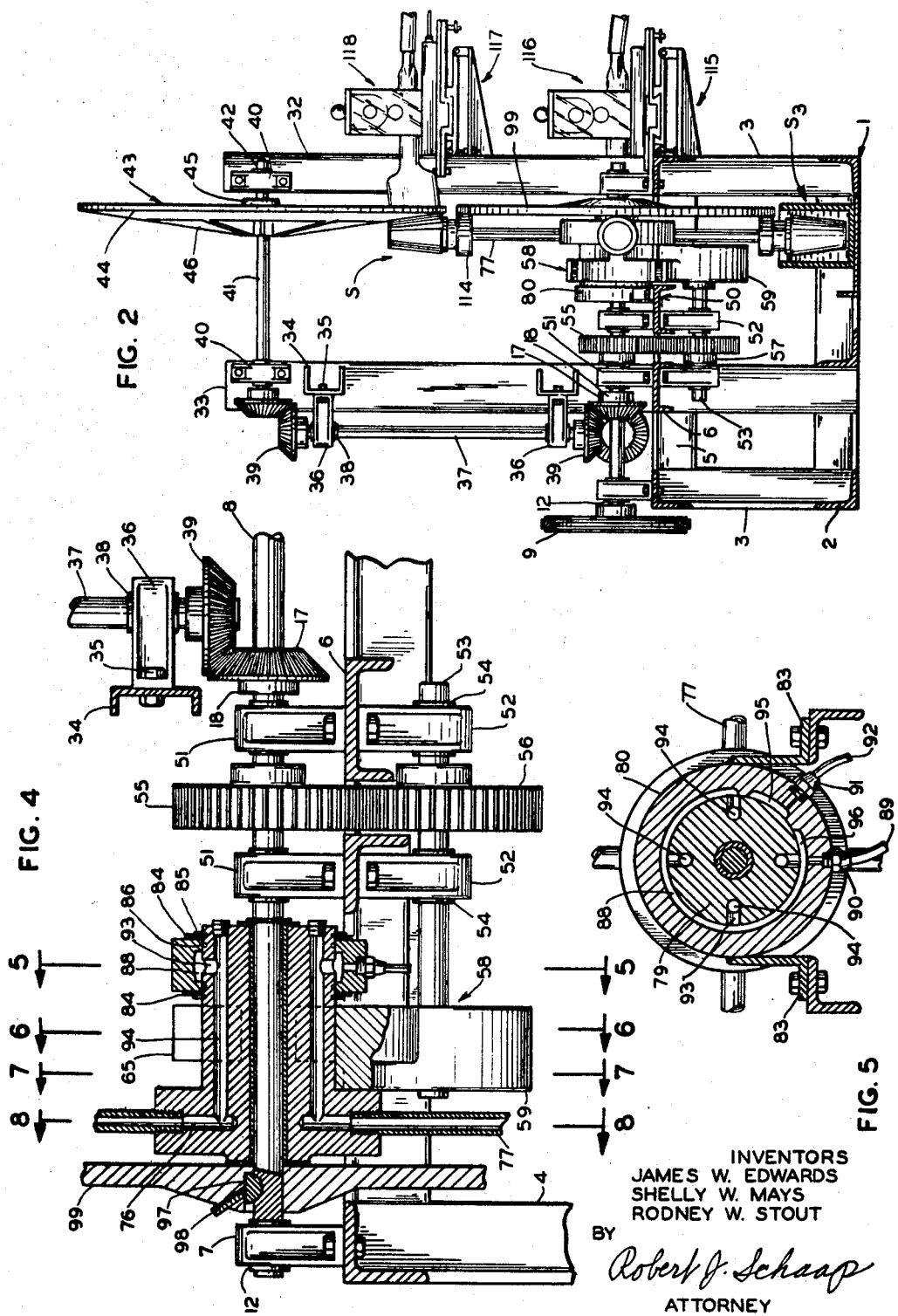

July 2, 1968  J. W. EDWARDS ET AL  3,390,756
GENEVA TYPE ACTUATING MECHANISM
Original Filed Aug. 25, 1965  5 Sheets-Sheet 3
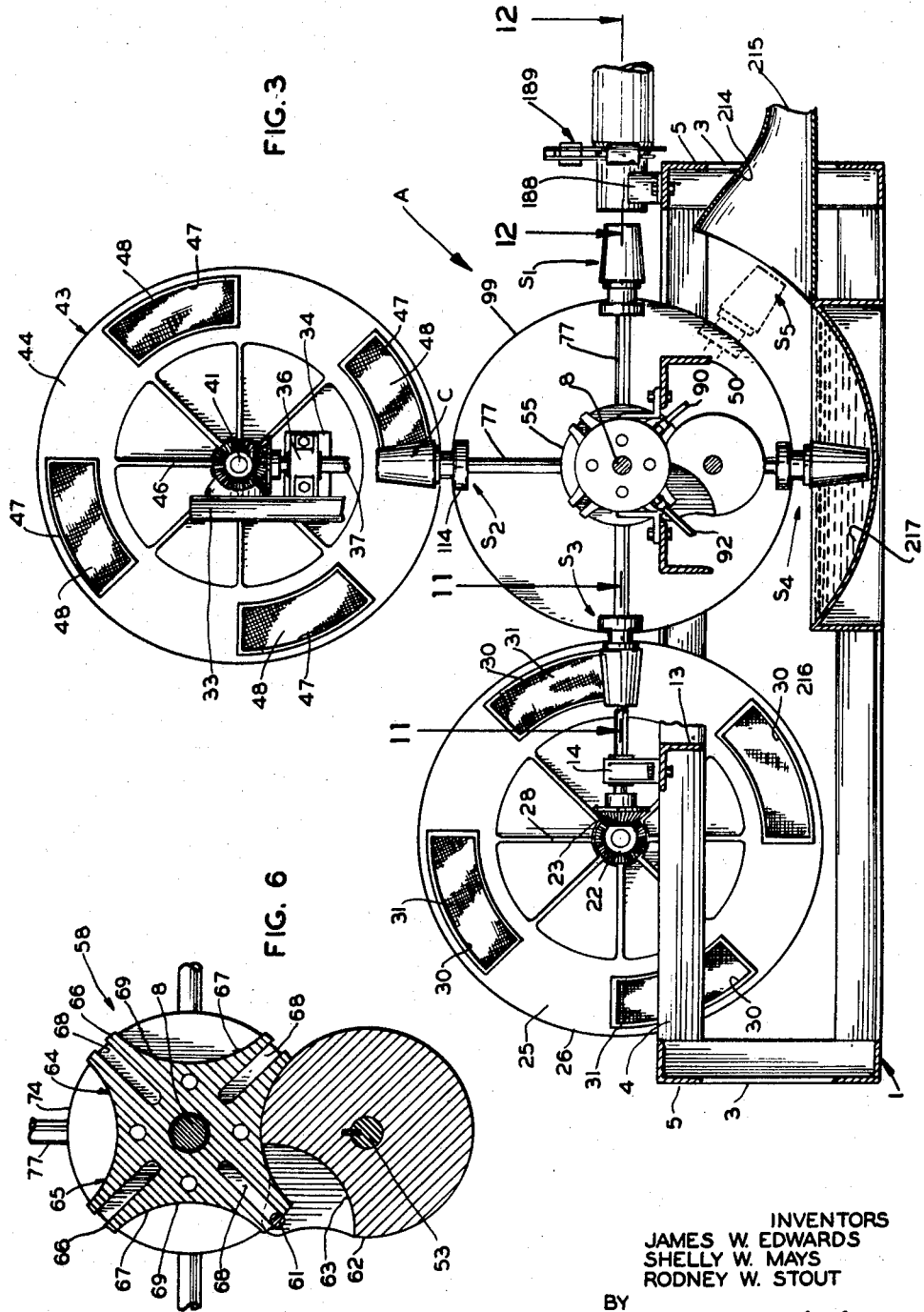
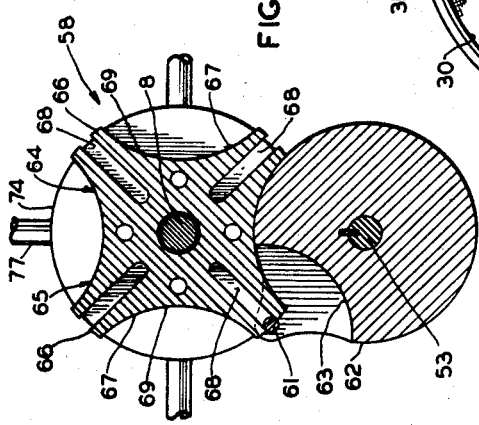
INVENTORS
JAMES W. EDWARDS
SHELLY W. MAYS
RODNEY W. STOUT
BY
*Robert J. Schaap*
ATTORNEY July 2, 1968   J. W. EDWARDS ETAL   3,390,756
GENEVA TYPE ACTUATING MECHANISM Original Filed Aug. 25, 1965    5 Sheets-Sheet 4

INVENTORS
JAMES W. EDWARDS
SHELLY W. MAYS
RODNEY W. STOUT
BY
*Robert J. Schaap*
ATTORNEY July 2, 1968  J. W. EDWARDS ETAL  3,390,756
GENEVA TYPE ACTUATING MECHANISM Original Filed Aug. 25, 1965  5 Sheets-Sheet 5

INVENTORS
JAMES W. EDWARDS
SHELLY W. MAYS
RODNEY W. STOUT
BY
*Robert J. Schaap*
ATTORNEY

United States Patent Office 3,390,756
Patented July 2, 1968

---

3,390,756
GENEVA TYPE ACTUATING MECHANISM
James W. Edwards, Creve Coeur, Shelly W. Mays, St. Louis, and Rodney W. Stout, Webster Groves, Mo., assignors to Monsanto Company, St. Louis, Mo., a corporation of Delaware
Original application Aug. 25, 1965, Ser. No. 482,475, now Patent No. 3,302,580, dated Feb. 7, 1967. Divided and this application Nov. 9, 1966, Ser. No. 593,039
2 Claims. (Cl. 198—135)

ABSTRACT OF THE DISCLOSURE

An electrostatic printing apparatus including a Geneva type mechanism for rotating a turret having four circumferentially spaced outwardly extending mandrel arms. The mandrel is rotatably mounted on the outer end of each arm and adapted to receive a thin walled container for printing. The container is forced onto the mandrel at a first work station where the turret is rotated 90° locating the mandrel at a second work station. A continuously rotating screen frame having four circumferentially spaced printing screens is rotated so that the surface of the container on the mandrel tangentially approaches and departs from the screen as the screen moves. An ink feeding mechanism disposed behind the screen passes ink through the screen to the container by means of an electrostatic field. The turret is then rotated an additional 90° where it is positioned at a third work station. At this third work station a second continuously rotating screen frame passes an electrostatic printing screen past the mandrel where a second print can be placed on the container. The turret is then rotated another 90° to a fourth work station where the mandrel is disposed in a fixing media for hardening the image thereon. The mandrel is then rotated for a last 90° in which it passes a fifth work station where the container is removed. Thereafter, the mandrel is shifted to the initial starting position.

---

This application is a division of our copending application Ser. No. 482,475, filed Aug. 25, 1965, now Patent No. 3,302,580.

This invention relates in general to certain new and useful improvements in electrostatic printing, and more particularly, to an improved automatically operable printing apparatus for electrostatic printing on a mass-production basis.

Since the advent of the thin-walled disposable containers made of plastic and synthetic resinous materials, these containers have found widespread use in the packaging industry. The vending machine industry particularly has been employing large quantities of nestable plastic containers in addition to the long-used conventional nestable paperboard containers. It is generally necessary, in this type of industry, to imprint the contents of the container, the name of the manufacturer, and/or distributor, and any other advertising and identification material on the sidewall of the container. The conventional printing methods employing offset printing techniques were not generally acceptable, because they were not adapted to mass-production operation and did not produce a desired quality of print. Because of the low profit margin on disposable containers, profits in this type of field are generally made on a volume sale basis. Accordingly, it is necessary to print containers of this type in an economically feasible manner and the containers must be printed automatically by suitable apparatus.

In an effort to find a suitable method of imprinting containers having frusto-conical shapes, there have been certain investigations in the field of electrostatic printing. However, the art of electrostatic printing is relatively new and this particular type of printing was only available for printing on flat or relatively flat items. To date, electrostatic printing techniques have not been adaptable for use in printing relatively larger areas on non-planar surfaces.

The presently known techniques in electrostatic printing are described in United States Letters Patent No. 3,081,698 which relates to a method of electrostatic printing by elimination of pressure or contact between the printing element and the subject material being printed. This technique involves the transfer of a resinous based ink through an electrostatic field to an image-receiving medium. The ink or pigments are usually in the form of a fine powder having a particle size which is small enough to pass through the interstices of the open areas of a stencil or so-called "screen." A roller or similar mechanical device normally carries the ink particles to a point in close proximity to the stencil and where the ink is carried through the stencil by the electrostatic field to the image-receiving object. During this transfer, the particles are triboelectrically charged and are thus attracted toward the image-receiving object by a dielectric potential applied to the object or to a backing electrode. The charge of the particles is, of course, opposite to the backing plate and they are, therefore, accelerated through the openings or interstices in the open areas of the screen. Moreover, they are propelled toward the image-receiving object. The image-receiving object normally consists of a mandrel which is capable of retaining the article to be printed. Thereafter, the pigment will collide with and adhere to the article which is to be printed and the image is subsequently fixed by heat or solvent or a vapor or by other suitable means which are known in the prior art.

Since the initial development of the theory of electrostatic printing, there have been many attempts to produce devices which are capable of automatic printing. Moreover, there have been attempts to print non-linearly shaped articles by electrostatic methods. However, all of the attempts to produce these automatic and semi-automatic devices for electrostatic printing have been rather unsuccessful and commercially unfeasible for a number of reasons. All of the electrostatic printing devices thus far employed have involved the transfer of ink across a definite and appreciable space and the particles of ink had to be physically transported across this space. However, surface tension effects on the delivery roller often prevented an even and uniform distribution of ink flow. Accordingly, the devices of the prior art had to be constructed in such manner that the field across which the particles moved had an extremely large potential difference. Moreover, the various electrodes had to be specially designed in order to prevent uneven distribution and flow of ink particles.

Moreover, the devices of the prior art were not designed with a wide range of utility, and accordingly, were not capable of printing with a wide variety of types, colors, and ink particle sizes. Relatively heavy electron space currents were used to assist in the movement of ink in order to attain even distribution with various sized particles of ink. However, the relatively high ionization level at the air gap for printing, often causes arcing which interferes with and materially reduces the overall efficiency of the electrostatic printing device. Furthermore, with the devices of the prior art, it was difficult to achieve a carefully constrolled quantity of electricity for effecting optimum results of the transfer of ink to the article being printed. As a result thereof, the devices of the prior art were not suitably designed for mass-production printing operations.

The substitution of a plate electrode for flat items was not an expensive or time-consuming procedure when printing on relatively flat surfaces. However, there was no available technique or device which was capable of accepting a large number of mandrels or article supporting spindles. It is not a particularly difficult function to change a mandrel, but the devices presently available are not designed to accommodate mandrels of a different size or shape. Inasmuch as electrostatic screen process printing involves accurate positioning of the electrodes within very close tolerance limits, the conventional printing apparatus of the prior art are not adaptable to electrostatic printing techniques.

It is, therefore, the primary object of the present invention to provide an electrostatic printing apparatus which is capable of electrostatically printing a large variety of articles having varying sizes and shapes.

It is another object of the present invention to provide an electrostatic printing apparatus and method of the type stated which is capable of achieving a high degree of printing precision on a mass-production basis.

It is a further object of the present invention to provide an electrostatic printing apparatus and method of the type stated which is characterized by simplicity, dependability, ruggedness and low cost.

It is also an object of the present invention to provide an electrostatic printing apparatus of the type stated which is capable of being altered for employment in a multi-color printing system.

It is an additional object of the present invention to provide an electrostatic printing apparatus of the type stated which is particularly adaptable to partial or complete circumferential printing on articles having curvilinear shapes.

It is another salient object of the present invention to provide an electrostatic printing apparatus and method of the type stated where tangential approach and tangential departure is maintained between an article being printed and the screen for printing to occur along an elemental line of closest approach, for each succeeding article on a mass-production basis.

With the above and other objects in view, our invention resides in the novel features of form, construction, arrangement and combination of parts presently described and pointed out.

In the accompanying drawings:

FIGURE 1 is a top plan view, partially broken away, of an electrostatic printing apparatus constructed in accordance with and embodying the present invention;

FIGURES 2, 3 and 4 are vertical sectional views taken along lines 2—2, 3—3 and 4—4 respectively of FIGURE 1;

FIGURES 5, 6, 7 and 8 are fragmentary sectional views taken along lines 5—5, 6—6, 7—7 and 8—8 respectively of FIGURE 4;

GENERAL DESCRIPTION

Figure 1:
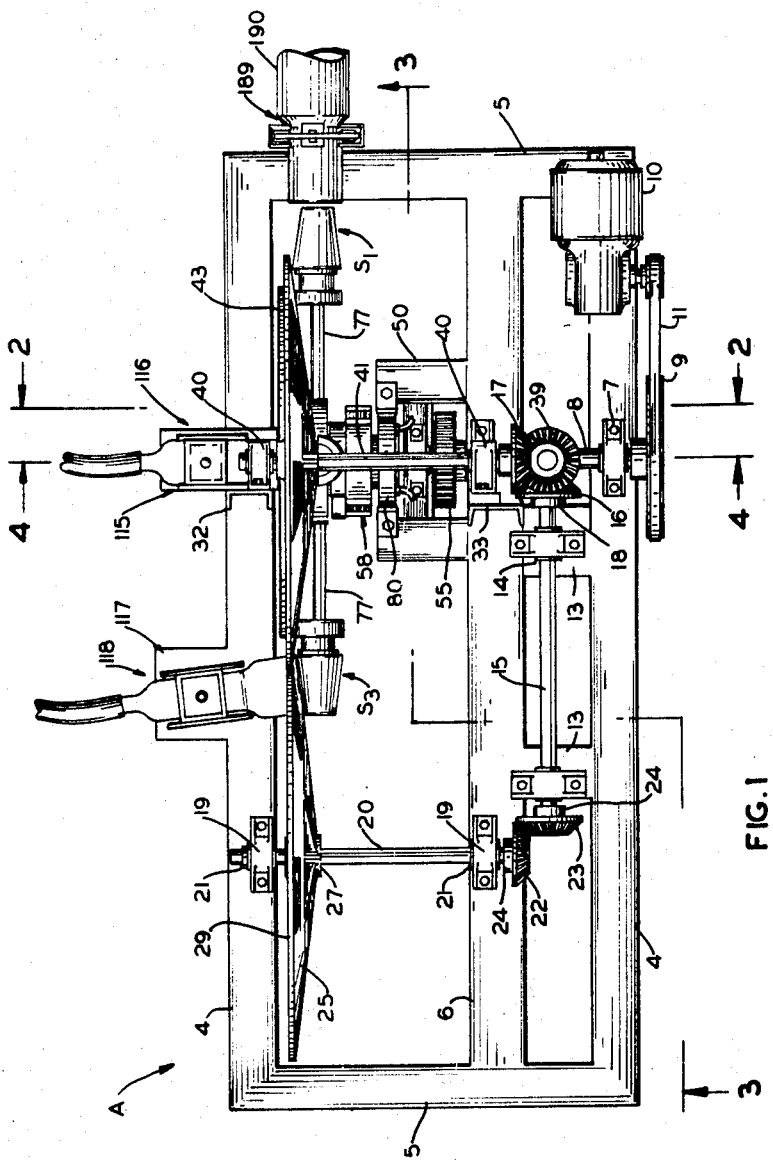

Generally speaking the present invention relates to an apparatus which is automatic in its operation, and method for electrostatic printing of conically shaped articles. The apparatus is designed to imprint desired information on the side walls of generally frusto-conically shaped containers of the nestable disposable type. However, the apparatus of the present invention is, of course, adaptable to electrostatic printing of many types and sizes of articles capable of receiving electroscopic ink. The apparatus generally comprises a base with a supporting frame constructed of standard roll-shaped channels. Operatively mounted on the supporting frame is a suitable electric motor for operating a pair of rotating screen support frames and an intermittently rotatable turret. Each of the screen supporting frames is continuously rotatable and each is provided with four radially spaced electrostatic printing screens. Each of the electrostatic printing screens is preferably provided with the same image so that each of the substrates to be printed will have the same image or pattern. Each of the rotatable screen support frames is so located that it does not interfere with the operation of each other, and moreover, each is driven by a complex gearing and drive shaft system.

The electric motor also operates a main drive shaft which, in turn, drives a primary Geneva shaft through a pair of meshing pinion gears. A primary Geneva mechanism is operable by the primary Geneva shaft and generally comprises a pin-wheel. A secondary Geneva mechanism is operatively mounted on the main drive shaft in operative relation to the primary Geneva mechanism. The secondary Geneva mechanism, however, in effect forms a quill on the main drive shaft which also serves as a secondary Geneva shaft.

The secondary Geneva mechanism generally comprises a slot-wheel which is provided with four radially spaced elongated slots. Each of the slots is engageable by the pin of the pin-wheel forming part of the primary Geneva mechanism. A turret supporting four radially extending mandrel shafts is rigidly connected to the slot-wheel of the secondary Geneva mechanism and is, in turn, rotated as the slot-wheel is rotated.

In its operation, the pin-wheel of the primary Geneva mechanism rotates approximately 270° during which time the turret is not moved. During the last 90° of rotation of the pin-wheel which will constitute one complete revolution thereof, the actuator pin of the pin-wheel will engage a slot in the slot-wheel and rotate the slot-wheel through a 90° turn. Rotation of this wheel will also rotate the turret through a 90° turn. Each of the mandrel shafts is hollow and is provided with cup supporting mandrels on its outer ends. Accordingly, as the turret rotates 90°, each of the mandrels on the outer ends of the mandrel shafts will rotate through a 90° arc with the turret.

A valve drum is also secured to the slot-wheel and is rotatable therewith. The valve drum is concentrically disposed within a valve manifold, the latter being rigidly secured to the supporting frame. The valve manifold is provided with a primary air passage or so-called vacuum passage which extends approximately through a 330° arc. The primary air passage is designed to maintain a vacuum on the valve drum in a manner hereinafter described. A secondary air passage extends for approximately 20° and is equidistantly disposed between the opposite ends of the 330° vacuum or primary air passage. The valve drum is provided with four sets of radial and communicating axial ducts, each of which, in turn, communicates with each of the four mandrels. Thus when one of the radial ducts is in communication with the secondary air passage, air will be supplied to the mandrel causing a container disposed on the mandrel to be ejected therefrom. When the radial duct associated with the mandrel is in communication with the primary air or vacuum passage, a vacuum is maintained on the mandrel, thereby holding the container onto the mandrel.

A friction wheel is also operatively mounted on the main drive shaft and is continually rotatable therewith. The friction wheel is designed to mesh and operate friction gears mounted on each of the mandrel shafts for rotating the mandrels with respect to the cup turrett as the turret rotates. While the drive mechanism described herein is referred to as a Geneva mechanism including primary and secondary Geneva mechanisms, it is to be understood that the components described herein do not comprise a true Geneva mechanism. The components described herein have been uniquely designed for purposes of this electrostatic printing apparatus. However, the terminology of the conventional Geneva mechansim has been employed as the unique drive disclosed herein operates on a principle similar to the operation of the conventional Geneva mechanism.

A suitable cup dispensing mechanism is disposed in proximate relationship to the mandrels for selectively dispensing a single cup which is deposited on the mandrel as the mandrel passes the cup dispensing mechanism. The placing of a container or cup on the mandrel constitutes a first work station or so-called "loading station." Thereafter, the turret is rotated through a 90° movement where the mandrel is shifted to a second work station or first printing station. In this station, the mandrel is positioned in relationship to the printing screen, where electrostatic printing on the container takes place. Thereafter, the turret is rotated through another 90° turn where the mandrel, with the cup supported thereon, is shifted to a third work station or second printing station. At the second printing station, electrostatic printing on a container can again take place. The image from the second printing station is generally marginally registered with the image of the first station and preferably with a different colored ink. Accordingly, multicolor printing can be employed on the present apparatus. Thereafter, the mandrel is rotated through another 90° turn where the container is introduced into a fixing tank permitting the image formed on the container to harden. During the last 90° quadrant, the container passes a discharge hopper maintained under vacuum, which constitutes a fifth work station or discharge station. The container is thereafter ejected from the mandrel and carried into a discharge tube. When the mandrel reaches the loading station again, a complete printing cycle has been performed. The mandrel and electrostatic printing screens are each rotated in pretimed relation. Moreover, the container is positioned in an axis of rotation so that the exterior wall of the container tangentially approaches and departs from the screen. Thus, printing will occur along an elemental line of closest approach between the container and the electrostatic printing screen. Moreover, the mandrel with the container supported thereon is rotated at approximately the same rate of speed or at the same peripheral speed as the movement of the screen so that a continuing line of tangency or tangential approach and departure occurs between the surface of the container supported on the mandrel and the surface of the screen. Actual tangential contact may not occur, however. The axis of rotation of the container may be axially translated slightly to prevent any tangential contact but still maintain tangential approach and departure. Accordingly, electroscopic ink is passed through the electrostatic printing screen along this line of tangency.

DETAILED DESCRIPTION

Referring now in more detail and by reference characters to the drawings which illustrate a preferred embodiment of the present invention, A designates an electrostatic printing apparatus which is formed by a pair of spaced longitudinally extending base channels 1, 2, provided at their corners with uprights 3. The uprights 3 are connected by a pair of upwardly spaced longitudinally extending support channels 4, and the base channels 2 and the upper channels 4 are connected by transverse channels 5. The channels 2, 4, 5 and the uprights 3 may be formed of any suitable standard rolled shape of channel, such as an I-beam shape or an H-beam shape or a standard U-beam shape, which is preferably formed of a relatively hard steel. Extending between each of the channels 4 is an intermediate support beam 6, substantially as shown in FIGURES 1 and 3.

Bolted or otherwise rigidly secured to the forward and rearward channels 4 in the manner as shown in FIGURES 1 and 2 are a pair of spaced aligned pillow blocks 7 for journaling a transversely extending drive shaft 8. Rigidly mounted on the forward end of the drive shaft 8 is a pulley 9 which is connected to a suitable electric motor 10 by means of a drive belt 11. The electric motor 10 is rigidly mounted on the forwardly presented upward longitudinal channel 4 and is preferably of the explosion proof type. Moreover, the motor 10 may be reversible, and should be provided with a suitable speed reducing mechanism.

The drive shaft 8 is suitably retained within the pillow blocks 7 by means of washers and lock rings 12, which are preferably mounted on each side of the pillow blocks 7 in the manner as shown in FIGURES 1 and 2.

Extending between and welded to the forwardly spaced longitudinal channel 4 and the intermediate support beam 6 are a pair of longitudinally spaced L-shaped support bars 13 and bolted or otherwise rigidly secured thereto are upstanding longitudinally aligned pillow blocks 14. Extending between and journaled in the pillow blocks 14 is a longitudinally extending screen drive shaft 15, which is provided at its right end, reference being made to FIGURE 1, with a bevel gear 16 and which in turn is positioned in meshing engagement with a mating bevel gear 17, the latter being mounted on the transversely extending drive shaft 8. The bevel gears 16–17 are generally conventional and are provided with hubs 18 for mounting on the respective shafts 15, 8 respectively. Bolted or otherwise rigidly secured to the rearward longitudinal support channel 4 and to the intermediate support beam 6 are a pair of transversely aligned pillow blocks 19 for journaling a transversely extending screen supporting shaft 20. The shaft 20 is conventionally retained in transverse position by means of washers and lock rings 21 which bear against each side of each of the pillow blocks 19 in the manner as shown in FIGURE 1. At its forwardly presented transverse end, the shaft 20 is provided with a bevel gear 22 which is positioned in meshing engagement with a mating bevel gear 23 mounted on the left end of the screen drive shaft 15. The bevel gears 22, 23 are similarly retained on the respective shafts 20, 15 by means of hubs 24. The hubs may be keyed to or secured to the shafts by means of set screws (not shown).

Keyed or otherwise secured to the screen supporting shaft 20 is a circular screen support frame 25. The screen support frame 25 is provided with an annularly extending forwardly presented frusto-conical surface 26 for reasons which will presently more fully appear. The screen support frame 25 is also provided with a hub 27 for axial shifting along the screen support shaft 20 to the desired position. For this purpose, the hub as indicated above, may be provided with a key or removable set screw. Furthermore, for support, the screen may have a plurality of radially spaced and radially extending gussets 28. On its rearward surface, reference being made to FIGURE 1, the screen support frame 25 is provided with an annular recess 29 which matches the frusto-conical surface 26.

Bolted or otherwise rigidly secured to the forwardly presented face of the frusto-conical surface 26 are four radially spaced screen retaining frames 30 for removably retaining electrostatic printing screens 31. The screen retaining frames 30 are so designed so that the electrostatic printing screens 31 may be easily removed and inserted therein when it is desired to change the printing design. Furthermore, by reference to FIGURE 3, it can be seen that the screen retaining frames are arcuately shaped and have an arcuate distance of approximately 45° with respect to the axial centerline of the screen support frame 25.

The rearward support channel 4 and an intermediate support beam 6 are provided with transversely aligned U-shaped slots for accommodating vertically extending support columns 32, 33 respectively, and which are welded to the rearward support channel 4 and the intermediate support beam 6 in the manner as shown in FIGURES 1 and 2. Welded to one transverse side of the support column 33 and extending outwardly therefrom are a pair of vertically aligned bearing support brackets 34 and rigidly secured thereto by means of bolts 35 are a pair of vertically aligned pillow blocks 36. Journaled in and extending vertically through the pillow blocks 36 is a screen drive shaft 37 which is retained in the pillow blocks 36 by means of washers and locking rings 38 mounted on opposite sides of each of the pillow blocks 36 in the manner as shown in FIGURE 2. At its lower end, the screen drive shaft 37 is provided with a bevel gear 39 which is positioned in meshing engagement with the bevel gear 17 for driving the shaft 37. Similarly bolted to the side walls of the support columns 32, 33 are a pair of transversely aligned pillow blocks 40 for journaling a screen supporting shaft 41. The supporting shaft 41 is similarly retained in the pillow blocks 40 by means of washers and lock rings 42 mounted on each side of each of the pillow blocks 40.

Mounted on the screen supporting shaft 41 and being rotatable therewith is a screen support frame 43 which has a forwardly presented frusto-conical surface 44. The screen support frame 43 is provided with a hub 45 for mounting the screen support frame 43 on the shaft 41, by any conventional means such as a key or set screw so that the screen support frame 43 may be shifted on the shaft 41 to a desired position. On its rearward surface, the screen support frame 43 is provided with a plurality of radially spaced gussets 46 which radiate outwardly from the hub 45 and provide sufficient internal strength against any strain supplied to the screen support frame 43. The screen support frame 43 is similarly provided with four radially spaced screen retaining frames 47 on its frusto-conical surface 44. Each of the four retaining frames 47 have an arcuate size of approximately 45° with respect to the axial centerline of the screen support frame 43 and each are designed so that an electrostatic printing screen 48 inserted therein may be easily removed and reinserted.

The electrostatic printing screen 48 is similar to the electrostatic printing screen 31 and both are generally constructed in the same manner and by the same process. However, it should be understood that the electrostatic printing screens 48 do not necessarily have to be provided with the same type of printed image or design as appears on the electrostatic printing screens 31. By further reference to FIGURES 1–3, it can be seen that the screen supporting frame 25 is driven through the shaft 20 and 15 by means of the bevel gears 16 and 17. The bevel gear 17 is driven through the shaft 8 which is, in turn, powered through the belt 11 by means of the electric motor 10. Similarly, the screen support frame 43 is continuously rotated by means of rotational power from the shafts 37, 41. The screen support frame 43 is similarly provided with a recess 49 in the area of the frusto-conical surface 44 for reasons which will presently more fully appear.

Welded to and extending rearwardly from the intermediate support beam 6 in approximate alignment with the transversely extending drive shaft 8, is a manifold support frame 50. The frame is generally constructed of standard rolled steel L-shaped brackets. Mounted on the upper surface of the intermediate support beam 6 and of the manifold frame 50 are a pair of pillow blocks 51 which are aligned with the pillow blocks 7 and provide additional support for the drive shaft 8. Similarly mounted on the underside of the longitudinally extending supporting beam 6 and on the underside of the manifold support frame 50 immediately beneath the pillow blocks 51 are a pair of transversely spaced pillow blocks 52 for journaling a primary Geneva shaft 53. Again, the shaft 53 is retained in transversely aligned position by means of washers and lock rings 54 mounted on each side of each of the pillow blocks 52. Also mounted on the drive shaft 8 and being interposed between the pillow blocks 51 is a driving pinion gear 55 which meshes with a driven pinion gear 56 mounted on the primary Geneva shaft 53. The pinion gear 56 is similarly positioned between each of the pillow blocks 52 in the manner as shown in FIGURE 2. The pinion gears 55, 56 are conventionally provided with hubs 57 for mounting on the respective shafts 53. The hubs may be conventionally provided with keys or set screws for securing the gears 55, 56 to the respective shafts on which they are mounted.

Mounted on the rearward end of the primary Geneva drive shaft 53 is a primary Geneva mechanism 58, which generally comprises a pin-wheel or so-called "pin-gear" 59. The pin-wheel 59 is generally circular in cross-section and is provided with an outwardly extending lobe 60 and mounted on the lobe 60 is an axially extending actuator pin 61. By reference to FIGURE 10, it can be seen that the lobe 60 is somewhat triangularly shaped and extends beyond the line which would form the peripheral margin of a truly circular wheel. The pin-wheel 59 is also provided in the area of the lobe 60 with a quarter-round or arcuate recess 62 having an arcuate guide wall 63.

Figure 7:
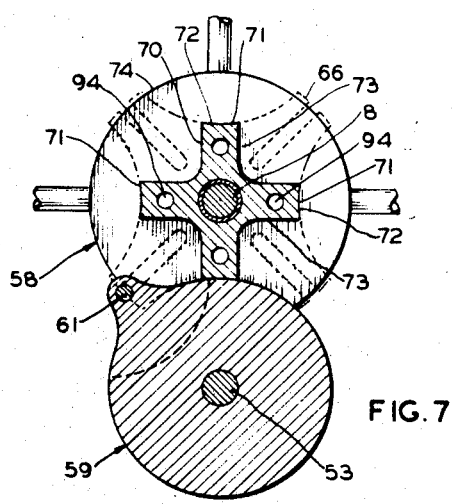

Rotatably mounted on the drive shaft 8 which also serves as a secondary Geneva shaft is a secondary Geneva mechanism 64. The secondary Geneva mechanism 64 generally comprises a slot-wheel or so-called "star-wheel" 65 which has four radially spaced crowns 66 connected by arcuately shaped webs 67. Thus, by reference to FIGURE 10, it can be seen that each of the crowns 66 is spaced at 90° intervals and is connected by the arcuately shaped webs 67. The radius of curvature of the arcuately shaped webs 67 is substantially equal to the radius of the pin-wheel 59, for reasons which will presently more fully appear. Each of the crowns 66 is provided with relatively deep pin engaging slots 68 and which are sized to accommodate the actuator pin 61. By reference to FIGURES 6 and 10, it can be seen that the webs 67 are provided with arcuately shaped concave guide surfaces 69. By reference to FIGURES 6, 7 and 9, it can be seen that the slots 68 are sufficiently deep so that the actuator pin 61 is extended therein to the full length of the guide slot 68 when the crowns 66 of the slot wheel 65 are engaged with the guide wall 63 of the pin-wheel 59. By further reference to FIGURES 6, 7 and 10, it can be seen that the concave guide surfaces 69 are formed with the same radius of curvature as the outer peripheral wall of the pin-wheel 59.

Rigidly secured to or integrally formed with the rearwardly presented flat surface of the slot-wheel 65 is a rearwardly extending web-wheel 70 having four radially spaced outwardly extending webs or arms 71, each of which is designed to carry pneumatic ducts in a manner hereinafter described in more detail. The web-wheel 70 is, in effect, angularly displaced 45° with respect to the slot-wheel 65 so that each of the four arms 71 is located midway between each of two slots 68. In this manner, a 45° angle exists between the centerline of one arm 71 and the centerline of one slot 68, whereas a 90° angle exists between the centerlines of each two slots 68, and a 90° angle exists between the centerline of each of two arms 71. This type of construction is more fully illustrated in FIGURE 6. Each of the arms 71 is provided with arcuately shaped concave peripheral surfaces 72 which match and are coplanar with the concave guide surfaces 69. It is important that the arms 71 do not extend beyond the concave guide surfaces 69 of the slot-wheel 65, for reasons which will be more fully apparent. Each of the arms 71 is separated by rectangularly shaped reliefs 73 and each of which is sized to accommodate the lobes 60. The slot-wheel 65 and the web-wheel 70 may be integrally formed by a cast-in-place mold, or the two elements may be cast separately or machined separately and thereafter welded to form a single unit. However, the method of constructing this mechanism does not in and of itself form part of the present invention and is, therefore, neither illustrated nor described in detail herein.

Figure 8:
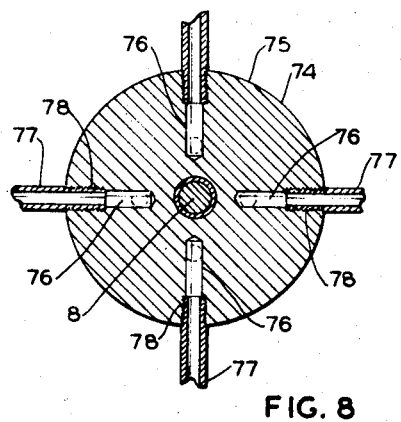
Figure 9:
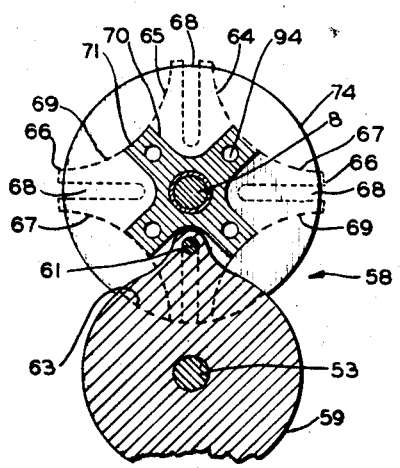
FIGURE 9 is a fragmentary sectional view similar to FIGURE 7 and showing the Geneva mechanism showing part of the present apparatus in a slightly different position.
Figure 10:
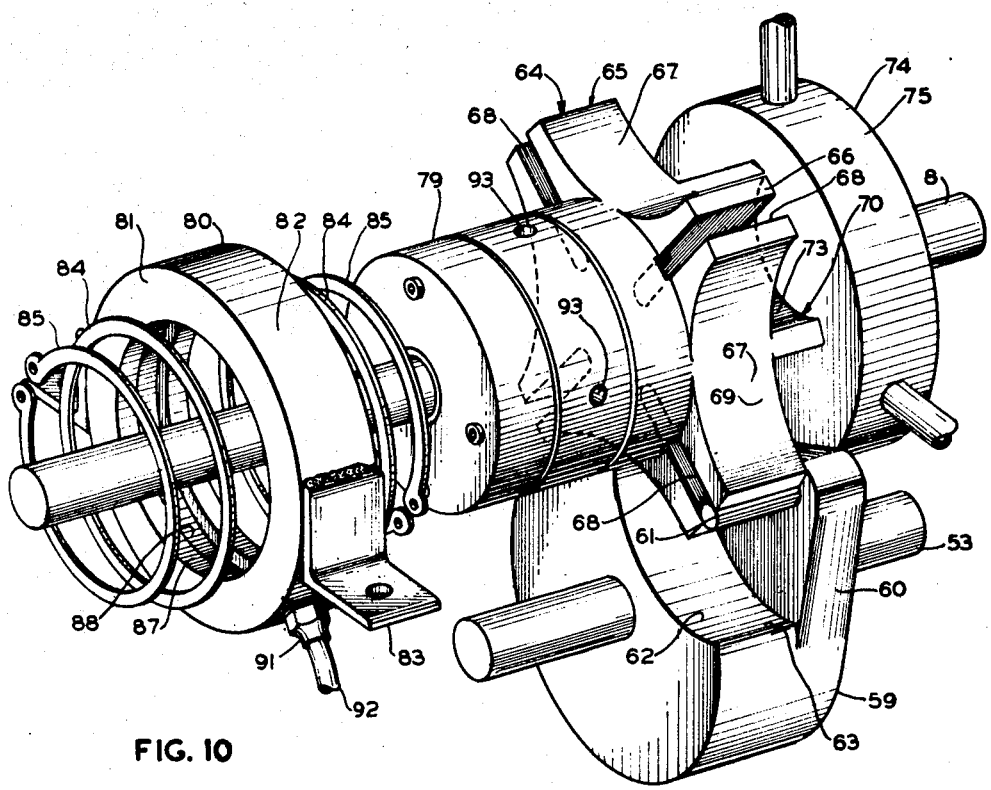
FIGURE 10 is an exploded perspective view of the Geneva mechanism and pneumatic control system forming part of the present electrostatic printing apparatus.

Rigidly secured to or otherwise integrally formed with the rearwardly presented surface of the web-wheel 70 is a turret 74, substantially as shown in FIGURES 4, 8 and 10. The turret 74 is provided with an annular side wall 75 which is drilled in the provision of four radially spaced bores 76 and which are internally threaded to accommodate mandrel shafts 77 having lower threaded ends 78. It should be understood that each of the mandrel shafts 77 extend outwardly in parallel relationship to each of the arms 71 of the web-wheel 70. Thus, by reference to FIGURES 6, 7, 9 and 10, it can be seen that the mandrel shafts 77 extend outwardly from the turret 74 at an angle which is midway between each of two radially spaced crowns 66. Thus, the shaft 77 extends outwardly at an angle of 45° with respect to each of the pin engaging slots 68.

Integrally formed with or otherwise rigidly secured to the forwardly presented surface of the slot-wheel 65 is a forwardly projecting coaxially extending valve drum 79 which is sized for concentric disposal within a valve manifold 80 having end walls 81 and an annular side wall 82. Welded to the annular side wall 82 are a pair of diametrally opposed L-shaped brackets 83 and which are bolted or otherwise rigidly secured to the manifold support frame 50 for retaining the valve manifold 80. A pair of washers 84 and a pair of lock rings 85 are disposed on opposite sides of the valve manifold 80 and which bear against the end walls 81 for sealing the manifold 80 and holding the manifold in axial alignment with the valve drum 79. Furthermore, it can be seen that the valve drum 79 is annularly grooved in the provision of a pair of annular slots to accommodate sealing rings 86. The sealing rings 86 may be formed of any suitable material normally employed in the manufacture of sealing rings, such as neoprene rubber.

The valve manifold 80 is formed of a hollow cylinder and is internally bored forming an interior wall 87. The manifold 80 is also formed on the interior wall with an annular primary air passage or recess 88. The primary air passage 88 is generally maintained under conditions of reduced air pressure and for the purposes of the present invention, is often referred to as a "vacuum passage." A suitable source of air under reduced pressure (not shown) may be supplied to the primary air passage 88 through a tube or line 89 connected to a fitting 90 which is, in turn, connected to the valve manifold 80 and communicates with the primary air passage 88. The manifold 80 is also provided with a second fitting 91 for retaining an air line 92 for reasons which will presently more fully appear. The air line 92 is connected to a suitable source of air pressure (not shown).

The valve manifold 80 is so positioned so that the air passage 88 remains in continuous fluid-type contact with four radially spaced radially extending fluid ducts 93. Moreover, by reference to FIGURE 4, it can be seen that the sealing rings 86 bear against the interior walls 87 on opposite sides of the air passage 88. The four radially spaced fluid ducts 93 in the valve drum 79 in turn communicate with four axially extending fluid ducts 94. By further reference to FIGURE 5, it can be seen that the axial fluid ducts 94 are in continual communication with the radial ducts 93. Moreover, it can be seen that the axial fluid ducts 94 extend through the valve drum 79, the slot-wheel 65, each of the arms 71 in the web-wheel 70 and through the turret 74. The axial fluid ducts 94, which extend through the turret 74 in turn communicate with the radial bores 76. Thus, it can be seen that fluid can be provided to the mandrel shafts 77 by passage of fluid through the line 89, the fitting 90, the annular passageway 88, through the radial fluid ducts 93 and the axial fluid ducts 94. The fluid is then delivered to the hollow mandrel shaft 77. The slot-wheel 65, the turret 74, the web-wheel 70 and the valve drum 79 may be integrally formed as a cast-in-place unit and milled to the desired degree of tolerance. However, each of these components could be formed as a unit with one or more of the components being added. Also, it is possible that each of the components can be separately manufactured and welded together in the manner as shown in FIGURE 10. Furthermore, it can be seen that this entire unit serves as a quill member and is rotatable with respect to the transversely extending drive shaft 8 which also serves as the secondary Geneva shaft.

It should be recognized that the component 58 is termed a "primary Geneva mechanism," and the component 64 is termed a "secondary Geneva mechanism" whereas in fact, these two components do not form a true Geneva mechanism. However, the terminology of the conventional Geneva mechanism has been employed as the unique drive disclosed herein operates on a principal similar to the operation of the conventional Geneva mechanism. However, it is pointed out that the drive mechanism provided herein is not the conventional well known Geneva mechanism.

Rotation of the transversely extending drive shaft 8 will rotate the driving pinion gear 55 which will in turn rotate the driven pinion gear 56 and the primary Geneva shaft 53. It can thus be seen that as the drive shaft 8 is continually rotated, the primary Geneva shaft 53 will be continually rotated. However, it can also be seen that since the secondary Geneva mechanism 64 in effect, forms a quill member on the drive shaft 8, it will not necessarily rotate with the drive shaft 8. Rotation of the primary Geneva shaft 53 will cause the pin-wheel 59 to rotate in a clockwise direction, reference being made to FIGURE 10. As this occurs, the annular side wall of the pin-wheel 59 will be slightly spaced from the concave guide surfaces 69 in one quadrant. Inasmuch as the guide surface 69 has the same radius of curvature as the annular surface of the pin-wheel 59, the secondary Geneva mechanism 64 and the slot-wheel 65 will not rotate on the main drive shaft 8. Continued rotation of the pin-wheel 59 will cause the outwardly extending pin 61 to engage a slot 68 in the next adjacent crown 66. Engagement of the pin 61 in the next adjacent slot 68 is more fully shown in FIGURE 6. Continued rotation of the pin-wheel 59 will cause the slot-wheel 65 to rotate in a counter-clockwise direction, reference being made to FIGURES 6, 9 and 10 until the position as shown in FIGURE 9 is attained. Again, the continued rotation of the pin-wheel 59 will continue to rotate the slot-wheel 65 until the pin 61 again reaches the position as shown in FIGURE 10. It can be seen that the pin-wheel 59 rotates for approximately 270° during the time that the slot-wheel 65 remains in a stationary position on the drive shaft 8. The additional 90° rotation of the pin-wheel 59 through a 90° angle will cause the pin 61 to move upwardly in one of the slots 68 and cause the slot-wheel 65 to rotate in a counter-clockwire direction, reference being made to FIGURES 6 and 10, through a 90° angle until the pin 61 moves downwardly in a slot 68. During the portion of the time that the pin 61 is engaged in the slot 68, the lobe 60 will fit into one of the rectangularly shaped reliefs 73 in the web-wheel 70. This type of actuation is more fully illustrated in FIGURES 6–10 showing the various positions of the primary and secondary Geneva mechanisms during actuation thereof:

The primary air passage 88 is not completely annular around the interior wall 87 on the valve manifold 80 and extends for an angle for approximately 330°. A secondary air passage 95 is also formed on the interior wall 87 and has an overall angle of approximately 30°. The secondary air passage 95 is separated from the air passage 88 by means of a pair of inwardly extending flanges 96 which are integrally formed with the interior wall 87. By further reference to FIGURE 5, it can be seen that the fitting 91 and the air line 92 connected thereto are in fluid communication with the secondary air passage 95 for supplying air under pressure thereto. By reference to FIGURES 5 and 10, it can be seen that of the mandrel shafts 77 will pass the secondary air passage 95 during the rotation of the turret 74. When all mandrel shafts 77 are located so that the valve drum 79 is in the position as shown in FIGURE 5, all mandrel shafts 77 will be maintained under a vacuum since the primary air passage 88 is maintained in operative communication with the source of reduced air pressure through the line 89. However, as the valve drum 79 rotates with the secondary Geneva mechanism 64, each succeeding mandrel shaft 77 will be placed in fluid communication with the secondary air passage 95. Air will then travel through the radial fluid duct 93, through the axial fluid duct 94 and through the mandrel shaft 77. It is to be noted that the secondary air passage 95 has a sufficient radial distance so that no air-lag is present. In other words, air under pressure will have sufficient time to reach the end of the mandrel shaft 77, for reasons which will presently more fully appear, during the portion of the time that each of the radial fluid ducts 93 is maintained in communication with the secondary air passage 95.

While it is recognized that the unique drive mechanism disclosed herein is not the conventional Geneva mechanism, it should be understood that the drive mechanism herein disclosed could be modified in much the same manner as a conventional Geneva mechanism to make a multiposition drive mechanism. For example, it is possible to employ a six or eight position drive mechanism by using a 6 or 8 position slot-wheel.

The secondary Geneva mechanism 64 with the valve drum 79 secured thereto as indicated, functions as a quill member on the drive shaft 8, the latter of which also serves as the secondary Geneva shaft. Rigidly secured to the rearward end of the drive shaft 8 by means of a Woodruff key 97 and a set screw 98 is a continually rotating friction wheel 99, substantially as illustrated in FIGURES 2 and 4.

Figure 11:
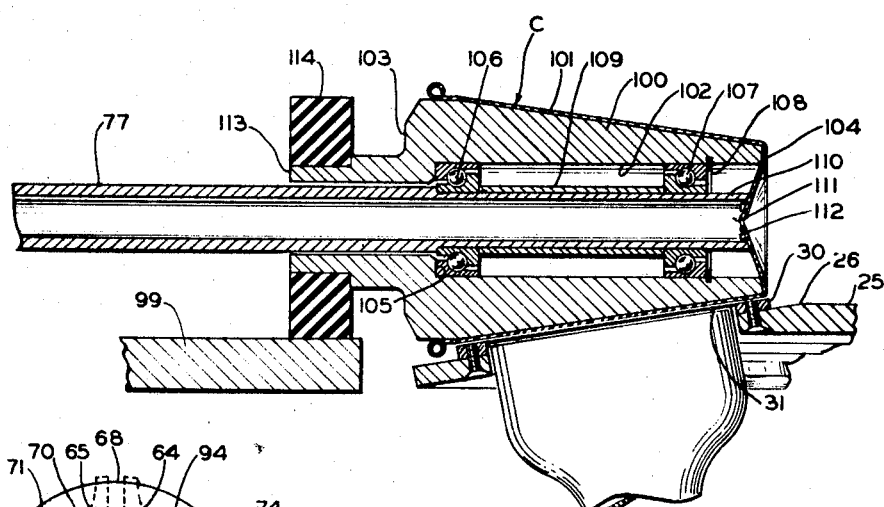
FIGURE 11 is a horizontal fragmentary sectional view taken along line 11—11 of FIGURE 3 and showing the contruction of the cup supporting mandrel forming part of the present apparatus.

Rotatably mounted on the outer end of the mandrel support shaft 77 is a conically-shaped container supporting mandrel 100 which is more fully illustrated in FIGURE 11. The container supporting mandrel 100 is generally formed of a frusto-conical shape and has an annular tapering side wall 101 and a hollow interior forming an axial chamber 102. The mandrel 100 is also provided with a relatively flat centrally apertured end wall 103 and a somewhat concave end wall 104. The interior chamber 102 is formed with a relatively flat shoulder 105 for retaining a roller bearing 106 and axially spaced from the bearing 106 is a second roller bearing 107 which is in turn retained in position by means of a locking ring 108. Each Each of the bearings 106, 107 are held in axial alignment by means of a spacer sleeve 109 which abuts against opposed margins of each of the bearings 106, 107 substantially as shown in FIGURE 11.

As indicated above, a mandrel 100 is positioned on the outer end of each of the four mandrel support shafts 77 so that they are positioned to align with each of the electrostatic printing screens 31, 48 in a manner to be hereinafter more fully described in detail. By reference to FIGURE 11, it can be seen that the mandrel 100 is positioned on a reduced outer end of the mandrel shaft 77. The outermost bearing 107 may be disposed about a locking ring as desired, in order to retain the mandrel 100 on the reduced portion of the mandrel shaft 77. At its outer end, the reduced portion of the mandrel shaft 77 is provided with a cup engaging open ended extension 110 having an inwardly presented concave surface 111 to match the concave surface of the end wall 104 on the mandrel 100. The extension 110 is provided with a plurality of radially spaced axially extending container engaging fingers 112 for engaging the bottom wall of a container C which may be disposed thereon. The container engaging fingers 112 are designed to engage the bottom wall of the container C in order to prevent collapsing of the container bottom wall when a vacuum is supplied to the mandrel shaft 77 and to the mandrel 100. It can be seen that the mandrel shaft 77 is hollow and communicates with the axial fluid duct 94 in the manner previously described. Accordingly, it can also be seen that a vacuum and air pressure is applied to the outer end of the mandrel 100 in timed relation to the rotation of the secondary Geneva mechanism 64. Thus, when it is desired to eject a container C from the mandrel 100, air is applied to the outer end of the mandrel 100 through the mandrel shaft 77 for forcing the container C off of the mandrel. On the other hand, when it is desired to retain the container C on the mandrel 100 during the electrostatic printing operations, it can be seen that the mandrel 100 is maintained in vacuum communication through the axial fluid duct 94 and with the source of vacuum. The end wall 103 of the mandrel 100 integrally merges into an axially extending hub 113 which is diametrically reduced to accommodate a roller wheel 114, the latter being in engagement with the outer peripheral margins of the annular surface on the friction wheel 99. Thus, it can be seen that inasmuch as the friction wheel 99 is continually rotating through the action of the drive shaft 8, the mandrel 100 will be continually rotating with respect to the mandrel shaft 77 through the action of the roller wheel 114.

The container supporting mandrel 100 is designed to accommodate disposable, nestable, thin-walled, plastic cups of the type which are commercially available and usually found in vending machines. However, it should be understood that the mandrel 100 can be readily removed and replaced with a similar mandrel accommodating cups or containers of a different size and shape. In this connection, it should be obvious that it is possible to provide mandrels to accommodate such containers as ice cream containers, cheese containers, or any similar open-ended container of this type. Moreover, it should also be understood that the present invention is not limited to the printing of plastic containers but can be employed to suitably print containers formed of paper, paperboard, etc.

By further reference to FIGURE 11, it can be seen that mandrel 100 is located at the frusto-conical surface 44 of the screen support frame 43. Thus, it can be seen that the annular wall 101 parallels the frusto-conical surface 44, which also retains the electrostatic printing screen 48. Thus, it is possible to employ the principles of printing on curved surfaces in the manner described in copending application Serial No. 472,829, filed July 19, 1965. In the printing of curvilinear shaped surfaces such as on conically shaped containers, the container is positioned in an axis of rotation so that the exterior wall thereof tangentially approaches and departs from the screen. Thus, printing will occur along an elemental line of closest approach between the container C and the electrostatic printing screen. Moreover, the mandrel 100 with the container supported thereon is rotated at approximately the same rate of speed or at the same peripheral speed as the movement of the screens 31, 48 so that a continuing line of tangency occurs between the surface of the container supported on the mandrel and the surface of the screens 31, 48. Simultaneously with the rotation of the container C supported on the mandrel 100 and the rotation of the screen support frame 43 which moves each of the screens 48 in timed relation to the rotation of the mandrel 100, electroscopic ink will be passed through the screen 48 to the container C in a manner hereinafter described. The ink particles are passed through the screen 48 along this line or band of tangency. In this manner, it is possible to provide electrostatically printed images on the surface of a curvilinearly shaped article, such as a conically shaped container.

It should be understood that the rolling wheel 114 should be sized so that the speed of rotation of the mandrel 100 is such that it has the same peripheral speed as the movement of the screen support frame 43 and the electrostatic printing screen 48. The same relationship exists between the screen support frame 25 with the screen 31 and the mandrel 100 as exists with the screen 48.

Welded or otherwise rigidly secured to the rearwardly spaced longitudinal support channel 4 is a feeding mechanism support frame 115 for retaining a suitable air operated ink feeding mechanism 116, which is designed to supply electroscopic ink to the electrostatic printing screens 31 on the screen support frame 25. Similarly welded to the support column 32 is an outwardly extending support frame 117 for retaining an air operated ink feeding mechanism 118 designed to supply electroscopic ink to the electroscopic printing screens 48 on the screen support frame 43. Each of the ink feeding mechanisms 116, 118 is similar to the air operated ink feeding mechanism described in my copending application Serial No. 461,044, filed June 3, 1965, now U.S. Patent No. 3,302,563 and therefore are neither illustrated nor described in detail herein.

Bolted to the upper surface of the right end transverse channel 5 is a pair of transversely spaced upstanding brackets 188 and secured to the brackets 188 is a container dispensing mechanism 189 for intermittently depositing a container C on each of the mandrels 100 as they pass the container dispensing mechanism 189. The container dispensing mechanism 189 generally comprises an outer housing 190, which is preferably formed of aluminum or other lightweight metal and is somewhat circular in vertical cross section, reference being made to FIGURE 1. This mechanism does not form part of the inventive concept herein and, therefore, is not further illustrated or described herein.

Mounted on the uprights 3 substantially as shown in FIGURE 3 is a container discharge funnel 214, which is connected to a discharge tube 215. The tube 215 and funnel 214 are maintained under a vacuum by a suitable vacuum source (not shown) in order to carry the containers in the discharge tube 215 to a suitable collection area (not shown). This type of mechanism is conventional in its construction and is, therefore, not described in detail herein. It should be recognized that the mandrels 100 are normally maintained under a vacuum and the air passage 88 is maintained in communication with the mandrel shaft 77 of each of these mandrels during the portion of the time that they are not in proximate relation to the discharge funnel 214. However, as the mandrels 100 approach the discharge funnel 214, the valve drum 79 is so rotated so that the mandrel 100 through the duct work previously described, is placed in communication with the secondary air passage 95 so that air is fed to the mandrel 100 causing the container C disposed thereon to be ejected. By reference to FIGURE 3, it can be seen that the funnel 214 has a sufficiently large mouth to permit air to pass through the secondary air passage 95 during the portion of the time that the valve drum 79 maintains the radial duct 93 in communication with the air passage 95 so that air is permitted to reach the mandrel 100, while it is in proximate relationship to the funnel 214.

An ink fixing tank 216 is also mounted on and extends between the two lower longitudinal base channels 2 in the manner as shown in FIGURE 3. The ink fixing tank 216 has an arcuate bottom wall 217, which somewhat approximates the arcuate movement of the mandrel 100. This type of association is more fully illustrated in FIGURE 3. The method of fixing the electrostatic printing image is not critical to the present invention and various well known methods in the prior art can be employed, such as the fixing by means of heat or selectively filtered radiation. However, it has been found that solvent vapor fixing of electrostatic printing images has proved to be one of the most effective methods of permanently fixing electroscopic ink on a substrate.

By reference to FIGURE 3, it can be seen that the electrostatic printing apparatus A is so constituted and arranged that there are, in effect, five work stations which are located in a 360° circle, namely the arcuate movement of at least one mandrel 100 in a full cycle. It can be seen that each of the mandrels 100 rotates in a counter-clockwise direction, reference being made to FIGURE 3 and that each printing cycle actually starts at the point where the mandrel 100 is in horizontal alignment with the container dispensing mechanism 189. Thus, the dispensing of a container C on a mandrel 100, which is located at the container dispensing mechanism 189 constitutes a first work station $S_1$, or so-called "loading station." As the mandrel 100 with the container C supported thereon moves in counter-clockwise direction to the first screen supporting frame 43, it is moved into a printing position for receiving a desired printed image. The printing of the container C at the first screen supporting frame 43 constitutes a second work station $S_2$, or so-called "first printing station." Continued rotation of the mandrel 100 to the screen support frame 25 where the container C similarly receives a printed image, constitutes a third work station $S_3$, or so-called "second printing station." After the container has received the electrostatic images from the second and third work stations, it is transferred to a fixing station $S_4$, which constitutes a fourth work station. After the fixing station $S_4$, the mandrel it rotated until it passes a discharge station, or fifth work station $S_5$, which is formed by the discharge funnel 214. It is to be noted that the mandrel 100 will stop at each of the first four work stations, namely $S_1$, $S_2$, $S_3$ and $S_4$. However, the mandrel 100 continues its rotation between the fourth work station, namely the fixing station $S_4$ and the first station or loading stations $S_1$. However, the container C is ejected in the funnel 214 as the mandrel 100 passes through the fifth work station $S_5$.

It should also be recognized that an electrostatic field is maintained between each of the electrostatic printing screens 31, 48 and the mandrels 100. The apparatus A may be conventionally provided with the necessary insulating sleeves and washers and electrical circuit necessary to provide the electrostatic field. This type of construction is conventional and is, therefore, neither illustrated nor described in detail herein. However, it should be pointed out that while current requirements for electrostatic printing of the type herein employed are not heavy in the ordinary sense, a very definite electron current or space current flows across the printing space during the printing operation. It is desirable to have a space current of at least 1 to 2 milliamperes per square inch of printing area. Moreover, the high potential source should be capable of maintaining a desired voltage under current drains in the range of approximately 100 milliamperes or slightly more.

OPERATION

In use as the container C passes the first printing screen 48 at the station $S_2$, it will receive the first colored ink. As it is shifted to the second printing station $S_3$, it will be printed with an image of the second colored ink. The two images of the two screens 31, 48 may be designed to provide overlying marginal registration of printed images. Therefore, suitable electrostatic printing screens 31, 48 will be mounted within the screen retaining frame 30, 47, respectively. Each of the retaining frames 40, 47 is then secured to the screen support frames 25, 43 in the manner as shown in FIGURE 3. The mandrels 100, which are mounted on each of the mandrel shafts 77, are sized to accommodate containers C which are then loaded into a suitable delivery mechanism for delivery to the container dispensing mechanism 189.

Upon energization of the electric motor 10, the drive belt 11 will rotate the pulley 9 and hence operate the drive shaft 8. Rotation of the transversely extending drive shaft 8 will rotate the driving pinion gear 55 which will, in turn, rotate the driven pinion gear 56 and the primary Geneva shaft 53. The actuation of the secondary Geneva mechanism 64 will cause the turret 74 to rotate in the manner as hereinafter described in more detail. As the turret 74 rotates, it will shift the first mandrel 100 in a counter-clockwise direction until it stops at the container dispensing mechanism 189.

When a container C is forced onto the mandrel 100, the valve drum 79 will be in the position as indicated in FIGURE 5. In other words, all of the radial fluid ducts 93, which lead to the mandrel shaft 77 and mandrels 100 will be in communication with the air passage 88 and, therefore, maintained under vacuum. Thus, the vacuum is imposed upon the extended end 110 of the shaft 77 and urges the container C onto the mandrel 100. Moreover, the fingers 112 will engage the bottom wall of the container C preventing collapsing of the bottom wall.

Continued rotation of the transversely extending drive shaft 8 will rotate the pinion gear 55, which, in turn, rotates the pinion gear 56 and the primary Geneva shaft 53, as indicated above. Thus, the primary Geneva shaft 53 is continuously rotated with the drive shaft 8. The rotation of the primary Geneva shaft 53 will cause the pin wheel 59 to rotate in a counter-clockwise direction, reference being made to FIGURE 10. However, the primary Geneva shaft 53 will rotate in a clockwise direction. As this occurs, the annular side wall of the pin wheel 59 will be slightly spaced from the concave guide surfaces 69 in one quadrant. Inasmuch as the guide surface 69 has the same radius of curvature as the annular surface of the pin wheel 59, the secondary Geneva mechanism 64 and the slot wheel 65 does not rotate on the main shaft 8. The continued rotation of the pin wheel will cause the outwardly extending pin 61 to engage a slot 68 in the next adjacent crown 66. The engagement of the pin 61 in this slot 68 is more fully shown in FIGURE 6. Continued rotation of the pin wheel 59 will cause the slot wheel 65 to rotate in a counter-clockwise direction, reference being made to FIGURES 6 and 10, until the position shown in FIGURE 9 is attained. In this position, the turret 74 will have rotated a full 45°. Further rotation of the pin wheel 59 will continue to rotate the slot wheel 65 until the pin 61 again reaches the position as shown in FIGURE 10. It can thus be seen that as the pin wheel 69 rotates for 360° it thereby rotates the slot-wheel 65 and the secondary Geneva mechanism 64 for a full 90° turn. During the first 270° rotation of the pin wheel 59, the slot-wheel remains stationary and the slot-wheel turns the full 90° during the last 90° rotation of the pin wheel 59.

Thus, it can be seen that the primary Geneva shaft 53 is continually rotating in a clockwise direction, reference being made to FIGURE 10, and continually rotates the pin wheel 59 in a clockwise direction. However while the main drive shaft 8 is continually rotating in a counter-clockwise direction, the secondary Geneva mechanism 64 will only rotate during the last 90° turn of the pin wheel 59. This 90° rotation advances the mandrel which was originally positioned at the loading station $S_1$ to the first printing station or second work station $S_2$. It can be observed that during the time that the turret 74 has rotated 90° in a counter-clockwise direction, the radial fluid duct 93 remains in fluid communication with the primary air passage 88 and, therefore, the mandrel 100 was maintained under a vacuum.

When the mandrel 100 reaches the first printing station $S_2$, the pin 61 will be located at the position as shown in FIGURE 10, where it is just being removed from engagement with the slot 68. The continued rotation of the pin wheel 59 will not affect the secondary Geneva mechanism 64 and the mandrel 100 will be temporarily positioned at the second work station $S_2$.

The continued rotation of the drive shaft 8 will, however, rotate each of the screen support frames 25, 43 in the manner previously described. Moreover, each of the screen support frames 25, 43 will rotate in a clockwise direction, reference being made to FIGURE 3 so that tangential approach and departure between the electrostatic printing screens 31, 48 and the mandrel 100 is maintained. It should also be understood that the various bevel gears employed in the apparatus A for rotating the screen support frames 25, 43 were sized so that these frames 25, 43 rotate at the same peripheral speed as the rotation of the mandrel 100. Furthermore, it can be seen that the roller wheel 114 resides in contact with the friction wheel 99, the latter being driven through the main drive shaft 8. Accordingly, the roller wheel 114 is sized so that it also provides the proper peripheral speed for the mandrel 100. In this manner, the tangential contact and approach between the mandrel 100 and the electrostatic printing screens 31, 48 is maintained. Furthermore, the ink feeding mechanisms 116, 118 are positioned so that it is positioned at this tangential line of closest approach. Consequently, the ink will be delivered to the screens at the tangential line of closest approach where the ink particles are than captured in the electrostatic field.

After the electrostatic printing has been performed at the first printing station $S_2$, the pin 61 has then approximately rotated 270° to the next slot 68. As the pin 61 engages the slot 68, it will rotate the secondary Geneva mechanism 64 through another 90° arc in a counter-clockwise direction, in the manner as previously described. As this occurs, the mandrel 100, which was positioned at the station $S_2$, is then shifted to the second printing station or third work station $S_3$.

When the mandrel 100 is located at the second printing station $S_3$, it will also be rotated in the manner as shown in FIGURE 3. Similarly, the screen support frame 25 is rotated in a clockwise direction so that tangential departure and approach is maintained between the mandrel 100 and the electrostatic printing screens 31. Again, the ink feeding mechanism 116 is so positioned so that ink will pass through the screen 31 along the elemental line of closest approach. Furthermore, it should be recognized that the images on the electrostatic printing screen 31 are similar to the images on the electrostatic printing screen 48 and moreover, are so positioned so that images from each of the screens will be marginally aligned for multicolor printing. It should also be recognized that if it is desired to perform only single color printing or print no other design at all on the container C, the electrostatic printing screen support frame 25 can be disconnected and removed from the printing operation. The printing which takes place at the work station $S_3$ is substantially similar to the printing which takes place at the work station $S_2$ and is, therefore, not described in further detail herein.

At this point, the pin 61 has again rotated 270° and is positioned at the next slot 68. Continued rotation of the pin 61 through the remaining 90° will again rotate the secondary Geneva mechanism 64 so that the mandrel 100 is located at the fourth work station or fixing station. In this case, the mandrel 100 with the container C disposed thereon is passed through the vapor phase of the solvent and the electrostatic printing image is fixed in the manner as previously described. The continued rotation of the turret 74 will move the mandrel 100 with the container C thereon out of the fixing tank 216, where the container is permitted to air dry thereby removing all of the solvent from a hardened ink. At this point, the images which were projected onto the container C have been hardened to a substantially permanent image.

The continued rotation of the pin wheel 59 and the secondary Geneva mechanism 64 will cause the mandrel 100 to pass into the fifth work station or discharge station $S_5$ in the area of the discharge funnel 214. By reference to FIGURE 5, it can be seen that as the turret continues to rotate, the valve drum 79 will also rotate causing the radial fluid duct 93 to communicate with the secondary air passage 95. As this occurs, air will pass from the secondary air passage 95, through the radial duct 93 and into the axial duct 94. The air will then be conducted through the hollow mandrel shaft 77 and to the mandrel 100. The air projected from the mandrel 100 will cause the container C to be ejected from the mandrel 100 and into the discharge funnel 214. As the container is ejected into the funnel 214, it is carried away through the discharge tube 215, since the latter is maintained under a vacuum. However, it should be recognized that there is a lag in the time that the container C leaves the fixing tank 216 and before it is ejected from the mandrel 100 due to the passage of air through the various ducts previously described. This air-lag time is sufficient to permit the container C to air dry before it is ejected from the mandrel. Moreover, the funnel 214 is sufficiently large to account for this air lag.

The continued rotation of the secondary Geneva mechanism 64 will cause the turret 74 to rotate until the mandrel 100 is again positioned at the loading station or first work station $S_1$. However, it can be recognized that during the time that one of the mandrels 100 progressed through each of the five work stations the other three mandrels on the turret 74 also progressed through the same five work stations in similar manner. Thus after the mandrel 100 is again positioned at the container dispensing mechanism 189, a new cycle can then be initiated in the manner as described.

It should be understood that changes and modifications may be made in the form, construction, arrangement and combination of parts presently described and pointed out without departing from the nature and principle of our invention.

Having thus described our invention, what we desire to claim and secure by Letters Patent is:

1. An article positioning mechanism for positioning articles to a desired location, said mechanism comprising a first continuously rotatable shaft, an actuating wheel operatively mounted on said shaft and rotating through continuous 360° revolutions, a second shaft operatively disposed in spaced relation to said first shaft, a slot-wheel having a plurality of engageable slots operatively mounted on said second shaft and being intermittently rotatable, a web-wheel operatively connected to said slot wheel and being rotatable therewith, said web-wheel having a plurality of enlarged circumferentially spaced recesses, an enlarged lobe on said actuating wheel and being sized to extend into any of the recesses of said web wheel, an extended pin on said actuating wheel for engaging any of said slots on said slot wheel and rotating the slot wheel through arcuate movements of selected angular length during arcuate rotational movements of said actuating wheel, a turret operatively connected to said slot wheel and being rotatable therewith so that said turret is moved to successive positions which are spaced by said selected angular length, means on said turret for retaining articles to be moved between the successive arcuate movements, a valve drum operatively connected to said actuating wheel and being rotatable therewith, and a valve manifold stationarily mounted with respect to said valve drum and being circumferentially disposed therearound in fluid cooperative relationship with said valve drum, said valve drum having a plurality of radial ducts each of which communicates with an axial duct, said axial ducts passing through said valve drum, said web wheel and said actuating wheel, said radial ducts being moved between a plurality of fluid passages in said valve manifold, as said valve drum rotates so that various fluid pressure relationships are transmitted through said axial ducts as said valve drum rotates.

2. A Geneva type actuating mechanism having an internal pneumatic control system, said mechanism comprising a first continuously rotatable shaft, actuating means mounted on said shaft and rotating through continuous 360° revolutions, a second shaft operatively disposed in spaced relation to said first shaft, an actuable means operatively mounted on said second shaft and being intermittently rotatable, engageable means on said actuating means for engaging said actuable means, a turret operatively connected to said actuable means and being intermittently rotatable therewith to a series of successive positions, article retaining means operatively mounted on said turret, a valve drum operatively connected to said actuable means and being rotatable therewith, and a valve manifold stationarily mounted with respect to said valve drum and being circumferentially disposed therearound in fluid cooperative relationship with said valve drum, said valve drum having a plurality of radial ducts each of which communicates with an axial duct, said axial ducts passing through said valve drum and actuable means and turret, additional ducts in said turret and article retaining means, said radial ducts being moved between a plurality of fluid passages in said valve manifold as said valve drum rotates, so that various fluid pressure relationships are transmitted through said axial ducts and said additional ducts as said valve drum rotates to create various pressure conditions at said article retaining means.

References Cited
UNITED STATES PATENTS

| | | | |
|---|---|---|---|
| 1,911,106 | 5/1933 | Camerota | 198—211 X |
| 2,278,804 | 4/1942 | Stuart | 73—45.3 |
| 2,320,064 | 5/1943 | Brenkert | 74—436 |
| 2,351,200 | 6/1944 | George et al. | 198—209 |
| 2,427,712 | 9/1947 | Casler et al. | 198—25 |
| 2,478,679 | 8/1949 | Bartelson | 74—436 X |
| 2,860,761 | 11/1958 | Kocan et al. | 198—210 X |
| 3,075,634 | 1/1963 | Schwacofer | 198—210 |
| 3,096,709 | 7/1963 | Eldred et al. | 198—210 X |

RICHARD E. AEGERTER, *Primary Examiner.*

EVON C. BLUNK, EDWARD A. SROKA, *Examiners.*

M. L. AJEMAN, *Assistant Examiner.*